US010746552B2

(12) United States Patent
Hashizume et al.

(10) Patent No.: US 10,746,552 B2
(45) Date of Patent: Aug. 18, 2020

(54) BOAT NAVIGATION ASSIST SYSTEM, AND NAVIGATION ASSIST APPARATUS AND SERVER OF THE SYSTEM

(71) Applicant: Honda Motor Co., Ltd., Tokyo (JP)

(72) Inventors: Takashi Hashizume, Wako (JP); Keiichiro Bungo, Wako (JP); Ryuichi Kimata, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 347 days.

(21) Appl. No.: 15/934,674

(22) Filed: Mar. 23, 2018

(65) Prior Publication Data

US 2018/0283874 A1 Oct. 4, 2018

(30) Foreign Application Priority Data

Mar. 29, 2017 (JP) ................................ 2017-064059

(51) Int. Cl.
*G01C 21/20* (2006.01)
*G09B 29/00* (2006.01)
*B63B 49/00* (2006.01)

(52) U.S. Cl.
CPC .............. *G01C 21/20* (2013.01); *B63B 49/00* (2013.01); *G01C 21/203* (2013.01); *G09B 29/007* (2013.01)

(58) Field of Classification Search
CPC combination set(s) only.
See application file for complete search history.

(56) References Cited

U.S. PATENT DOCUMENTS

2003/0112171 A1* 6/2003 Michaelson ............ B63B 43/18 342/41
2005/0234646 A1* 10/2005 Watts ...................... G01W 1/00 702/3
2008/0027690 A1* 1/2008 Watts ...................... G01W 1/00 703/5
2011/0313655 A1* 12/2011 Litvack .................. G01C 21/20 701/426
2015/0042505 A1* 2/2015 Hope ........................ G01S 5/06 342/41
2016/0001856 A1* 1/2016 Gentle .................... B63B 49/00 701/21
2016/0077199 A1* 3/2016 Nickel .................... G01S 15/96 367/107
2016/0167750 A1* 6/2016 Napolitano ............. B63B 49/00 701/454
2016/0223336 A1* 8/2016 Robideaux ............. G01C 21/20
2017/0192092 A1* 7/2017 Seifert .................... G01S 15/89

FOREIGN PATENT DOCUMENTS

JP H0747992 A 2/1995

* cited by examiner

*Primary Examiner* — Christian Chace
*Assistant Examiner* — Jordan S Fei
(74) *Attorney, Agent, or Firm* — Duft & Bornsen, PC

(57) ABSTRACT

A navigation assist system having a plurality of navigation assist apparatuses installed on small boats like motorboats each fitted with an outboard motor to be able to navigate in a predetermined water area, and a server placed on land to communicate with the navigation assist apparatuses. Each of the navigation assist apparatuses detects a sharp turn position of the boat, adds the position to a danger level data downloaded from the server unit, and alerts an operator concerned when the boat approaches a region whose danger level is great.

14 Claims, 11 Drawing Sheets

400 500 SERVER CLOUD 4 : LAND 300 2 : PREDETERMINED WATER AREA 3G NETWORK, ETC. 1 10 12 200 10 10 200 1 10 12

BOAT NAVIGATION ASSIST SYSTEM, AND NAVIGATION ASSIST APPARATUS AND SERVER OF THE SYSTEM

CROSS-REFERENCE TO RELATED APPLICATION

This application is based upon and claims the benefit of priority from Japanese Patent Application No. 2017-064059 filed on Mar. 29, 2017, the contents of which are incorporated herein by reference.

BACKGROUND OF THE INVENTION

Field of the Invention

This invention relates to a navigation assist system for a motorboat or other small boat, and a navigation assist apparatus and server thereof.

Description of Related Art

A small boat such as a motorboat (outboard motor craft) is often brought into relatively shallow water. In such cases, the outboard motor is sometimes damaged by collision with objects like rocks projecting up from the sea floor. Although a fish finder can be installed to measure water depth, fish finders are hard to mount on a small boat because they are expensive and troublesome to set up.

In addition, the known technology of Japanese Unexamined Patent Publication No. 1995 (Hei 7)-47992A is adapted to detect a boat's own position, show an electronic nautical chart corresponding to the position on a display, determine danger of grounding from water depth and other data of the electronic nautical chart, and produce a grounding alarm when distance between the subject boat and a shoal comes within a grounding danger distance.

In another aspect, the technology of the reference is adapted not only to create the electronic nautical chart corresponding to the subject boat position in the display but also to join adjacent electronic nautical charts therewith to create a single electronic nautical chart and further to utilize water depth contours of the single electronic nautical chart to discover presence of shoals forward of the boat and produce alarms. As a result, shoal presence alarms can be made even before the nautical chart display is switched.

However, since, as stated above, the technology taught by the reference determines danger of shoals based on water depth contour data of the electronic nautical chart, it cannot take rocks and other objects projecting from the sea floor or projections like posts visibly projecting up above the sea surface into account and is therefore incapable of producing danger alarms utilizing data based on actual navigation conditions.

SUMMARY OF THE INVENTION

An object of this invention is therefore to overcome the aforesaid problem by providing a navigation assist system adapted to assist navigation by appropriately producing alerts and/or alarms consistent with actual navigation circumstances of a small boat in a predetermined water region when the subject boat approaches a dangerous region, and a navigation assist apparatus and a server of the system. "Water area" as termed in this specification is defined to conceptually include a region on the ocean and lake.

In order to achieve the object, this invention provides a navigation assist system having; a plurality of navigation assist apparatuses installed on boats each fitted with an outboard motor to be able to navigate in a predetermined water area, and a server configured to communicate with the navigation assist apparatuses; wherein each of the navigation assist apparatuses comprises: a sharp-turn detector unit configured to detect sharp-turn of one of the boats that navigates in the predetermined water area within a predetermined speed range; a sharp-turn position data transmitter unit configured to detect a position data of the one of the boats as a sharp-turn position data when the sharp-turn detector unit detects the sharp-turn of the boat and send the sharp-turn position data to the server; a danger level data download unit configured to download from the server danger level data indicating danger level of individual coordinate domains of the predetermined water area divided into mesh-like coordinate domains; a danger level data display unit configured to display the downloaded danger level data on a map of the predetermined water area in association with coordinate regions corresponding to the coordinate domains; and an alert/alarm unit configured to inform an operator of each of the boats by displaying an alert or sounding an alarm, when the each of the boats approaches to within a predetermined distance of one of the coordinate regions on the map whose danger level of the danger level data is equal to or greater than a prescribed level; wherein the server comprises: a sharp-turn position data receiver/memory unit configured to receive the sharp-turn position data from the navigation assist apparatuses installed on the boats and stores the received sharp-turn position data in association with the individual coordinate domains of the predetermined water area divided into mesh-like coordinate domains; a danger level data update/storage unit configured to determine danger level of individual coordinate regions based on the sharp-turn position data stored in association with the individual coordinate domains, and update and store the danger level data; and a danger level data transmitter unit configured to transmit the danger level data of the individual coordinate regions to the navigation assist apparatuses in response to the download request made by the navigation assist apparatuses.

DETAILED DESCRIPTION OF THE INVENTION

An embodiment for implementing the navigation assist system and the navigation assist apparatus and server of the system are explained with reference to the attached drawings in the following.

Figure 1:
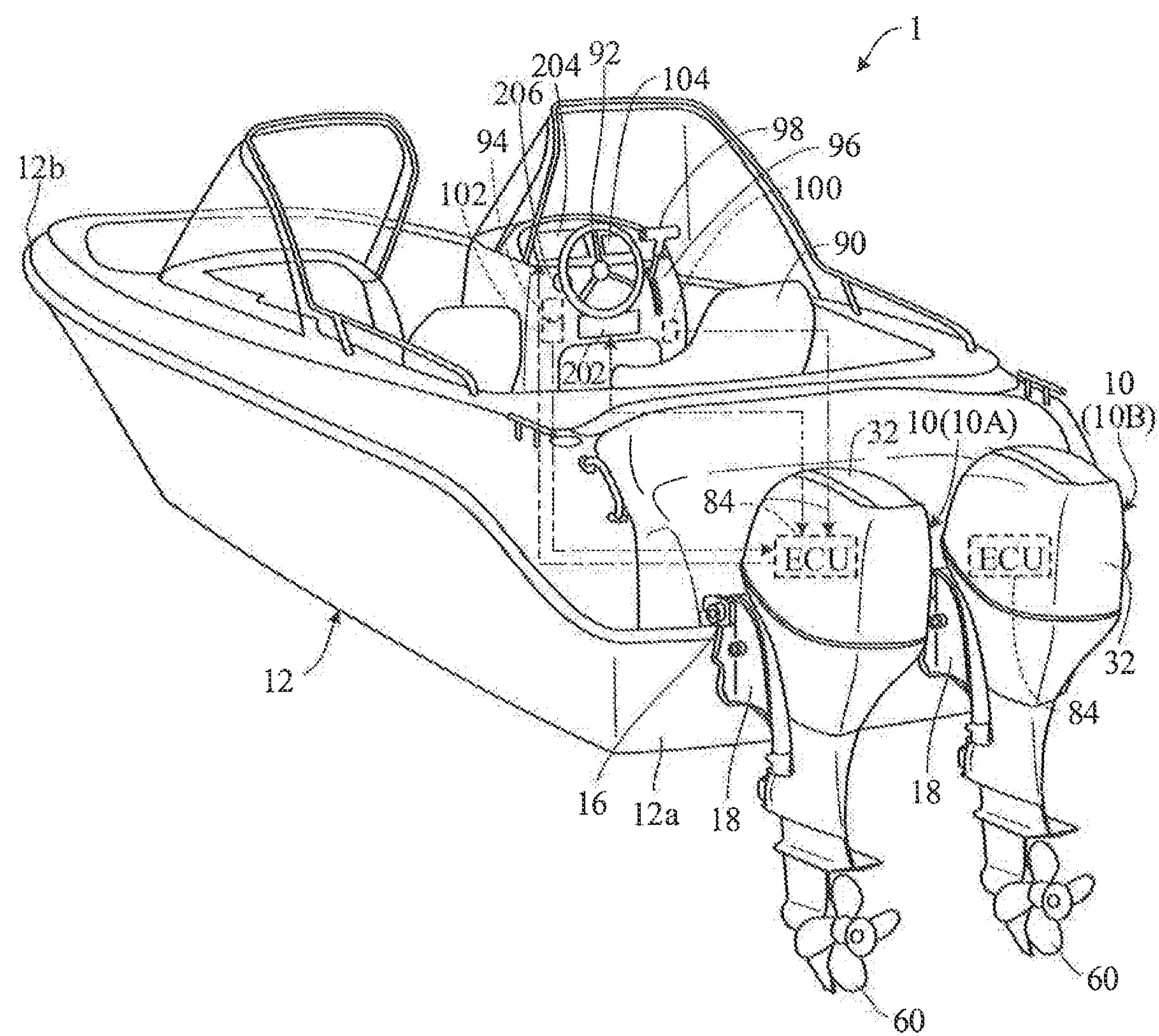
FIG. 1 is an external perspective diagram of an example of a small boat incorporating a navigation assist system according to an embodiment of this invention, viewed obliquely from behind.
Figure 2:
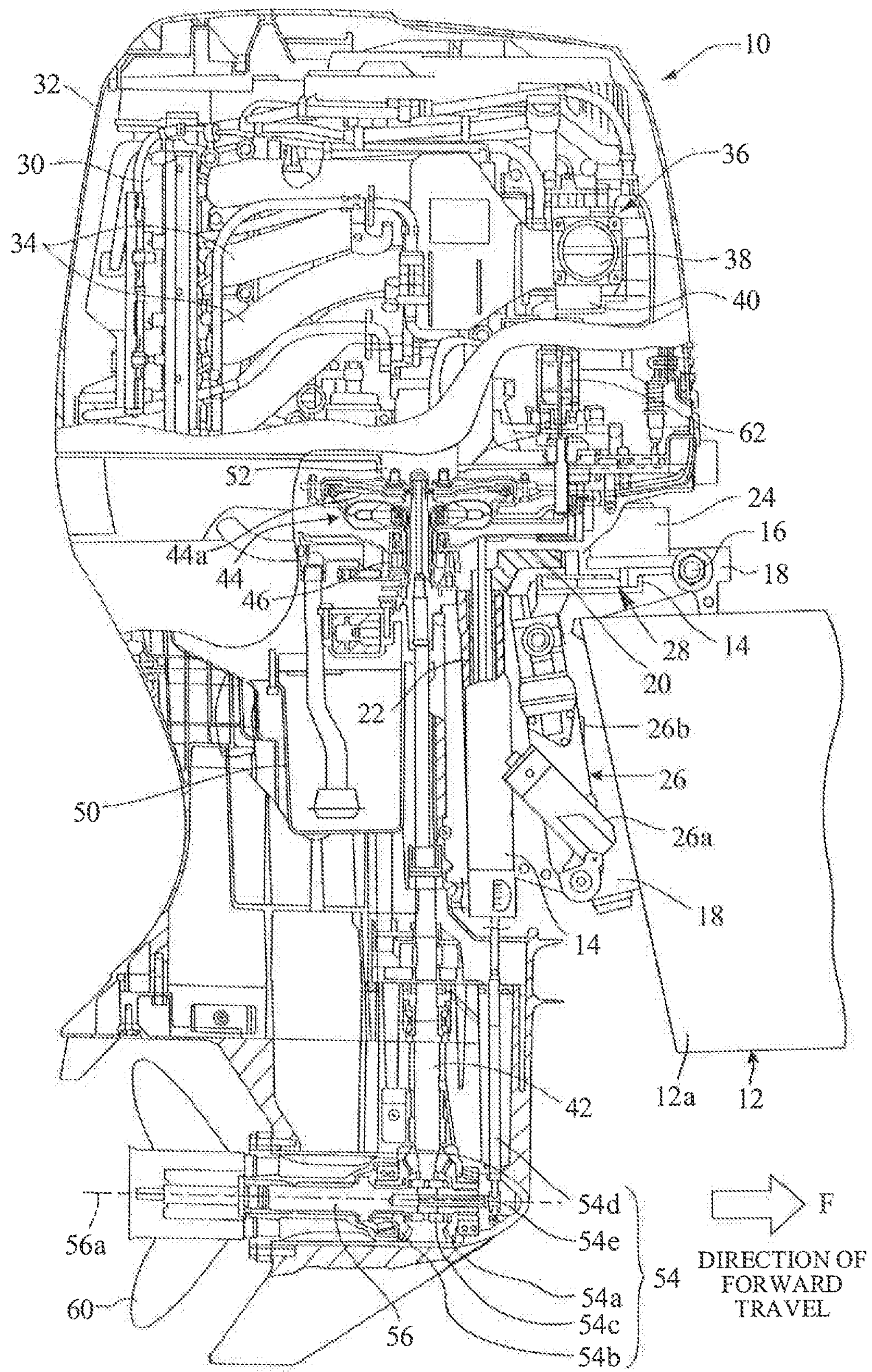
FIG. 2 is an enlarged side view (partially in section) of an outboard motor mounted on the small boat of FIG. 1.
Figure 3:
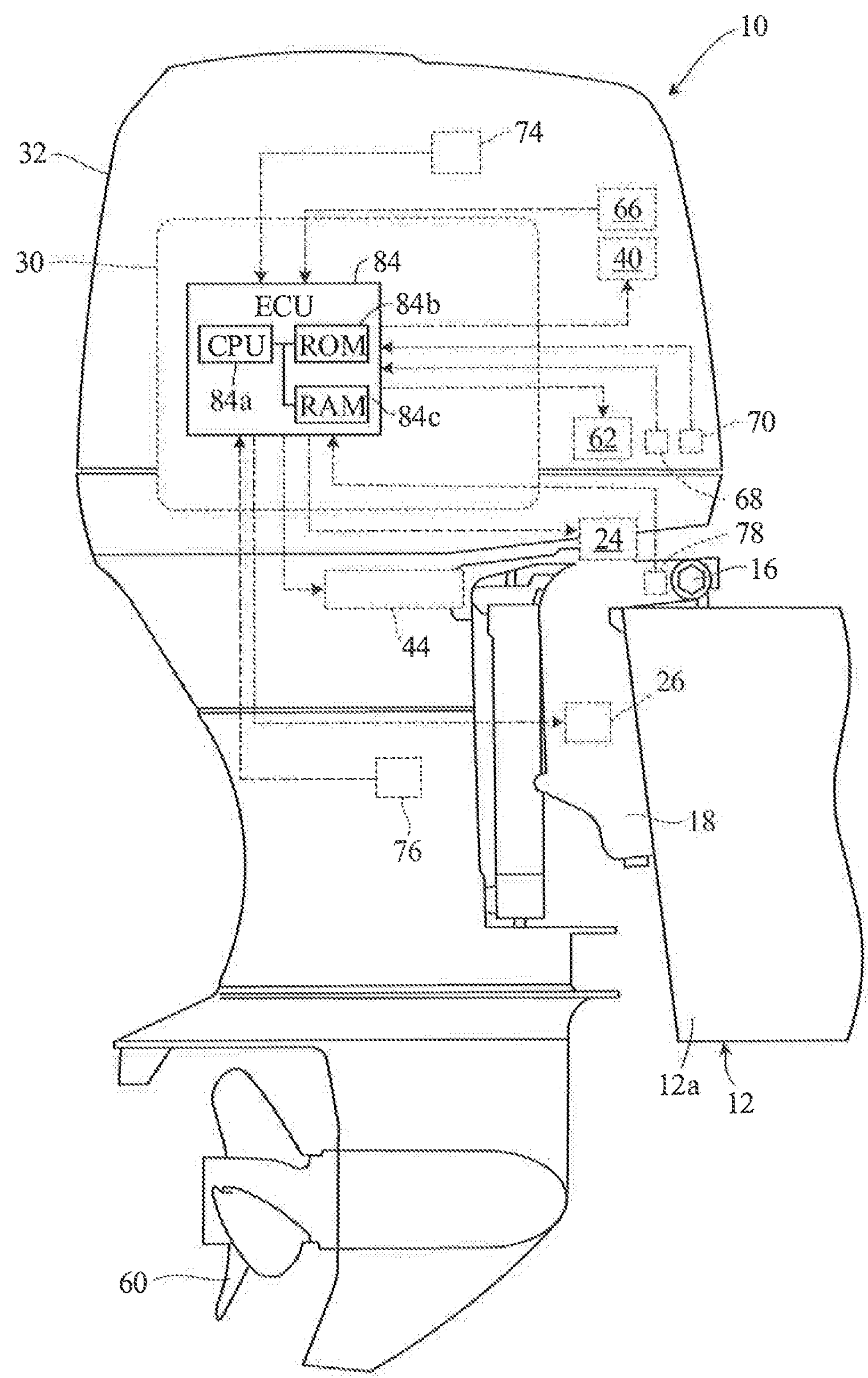
FIG. 3 is an explanatory diagram of an essential part of the outboard motor of FIG. 2.

FIG. 1 is an external perspective diagram of a small boat incorporating a navigation assist system according to an embodiment of this invention, viewed obliquely from behind; FIG. 2 is an enlarged side view (partially in section) of an outboard motor mounted on the small boat of FIG. 1; and FIG. 3 is an explanatory diagram of an essential part of the outboard motor.

Reference numeral 1 in FIG. 1 designates a small boat of the type commonly called a motorboat. As termed in this specification, "small boat" refers to a boat of less than 20 gross tons.

The small boat (sometimes called simply "boat" hereinafter) 1 shown in FIG. 1 is a so-called dual motor boat (even number of motors) that has twin outboard motors 10 mounted at a stern 12*a* of a hull 12 (or boat 1). In FIG. 1, the outboard motor on the left side (port side) relative to direction of forward travel is designated "first outboard motor 10A," with A appended as a subscript, and the outboard motor on the right side (starboard side) relative to direction of forward travel is designated "second outboard motor 10B," with B appended as a subscript. However, as the first outboard motor 10A and the second outboard motor 10B are identically structured outboard motors, they are explained in the following as outboard motor 10 with the subscripts A and B omitted.

As shown in FIGS. 1 and 2, the outboard motor 10 has a swivel case 14 and a tilting shaft 16 by which it is attached through a stern bracket 18 to the stern 12*a* of the hull 12. A bow of the hull 12 (or boat 1) is designated by symbol 12*b*.

The outboard motor 10 is equipped with a mount frame 20 and a swivel shaft 22, and since the swivel shaft 22 is accommodated inside the swivel case 14 to be rotatable around a vertical axis, the outboard motor 10 is rotatable with respect to the hull 12 around the vertical axis. The upper and lower ends of the mount frame 20 are fastened to a frame (not shown) constituting a body of the outboard motor 10.

An electric steering motor 24 for driving the swivel shaft 22 and a power tilt-trim unit 26 for regulating tilt angle and trim angle of the outboard motor 10 with respect to the hull 12 are installed near the swivel case 14. An output shaft of the electric steering motor 24 is connected through a reduction gear mechanism 28 to an upper end of the mount frame 20. Specifically, a configuration is adopted by which rotational output of the electric steering motor 24 is transmitted through the reduction gear mechanism 28 to the mount frame 20, thereby enabling clockwise and counterclockwise rotation of the outboard motor 10 around a vertical axis, i.e., around the swivel shaft 22, as a steering axis. This steers the forward travel direction of the boat 1 (hull 12) starboard and port.

The power tilt-trim unit 26 is integrally equipped with a hydraulic cylinder mechanism 26*a* for adjusting tilt angle and a hydraulic cylinder mechanism (trim actuator) 26*b* for adjusting trim angle (rotation angles of the outboard motor 10 around the pitch shaft (x-axis) constituted as a horizontal shaft in the width direction of the hull 12 as its axis of rotation). And the swivel case 14 is rotated around a horizontal axis (pitch axis) perpendicular to the vertical axis using the tilting shaft 16 as its axis of rotation by supplying (discharging) hydraulic oil to (from) and extending/contracting the hydraulic cylinder mechanisms 26*a* and 26*b*. As a result, a structure is established by which the outboard motor 10 can be tilted up/down and trimmed up/down.

An engine (internal combustion engine) 30 is built into (mounted in) an upper portion of the outboard motor 10. The engine 30 is a spark-ignition, water-cooled gasoline engine. The engine 30 is enclosed by an engine cover 32 and positioned above the water surface.

A throttle body 36 is connected to an air intake pipe 34 of the engine 30. The throttle body 36 has an internal throttle valve 38 and an integrally attached throttle electric motor (throttle actuator) 40 for opening/closing the throttle valve 38.

An output shaft of the throttle electric motor 40 is connected to the throttle valve 38 through a reduction gear mechanism (not shown) installed adjacent to the throttle body 36. Engine speed is regulated by operating the throttle electric motor 40 to open and close the throttle valve 38 and thereby control air intake volume of the engine 30.

The outboard motor 10 is equipped with a driveshaft (vertical shaft) 42 rotatably supported parallel to the vertical axis, a torque converter 44 interposed between the engine 30 and the driveshaft 42, a hydraulic pump 46 for delivering hydraulic oil attached to the driveshaft 42, and a reservoir 50 for storing hydraulic oil.

Driven by the engine 30, the hydraulic pump 46 pumps hydraulic oil from the reservoir 50 and supplies hydraulic oil to, inter alia, lubrication sites of the engine 30, the hydraulic cylinder mechanisms 26*a* and 26*b* of the power tilt-trim unit 26, and a lock-up mechanism 44*a* of the torque converter 44.

In the outboard motor 10, a propeller shaft 56 supported to be rotated through a shift mechanism 54 including a bevel gear mechanism is supported at a lower end of the driveshaft 42 rotated by the engine 30 to be rotatable around a horizontal axis, whereby it can lie substantially parallel to the travel direction of the hull 12. A crankshaft 52 of the engine 30 is connected through the torque converter 44 to an upper end of the driveshaft 42. In initial state of the power tilt-trim unit 26, the propeller shaft 56 is oriented with its axis 56*a* lying substantially parallel to the direction of travel of the hull 12. A propeller 60 is attached to one end of the propeller shaft 56.

The shift mechanism 54 comprises, inter alia, a forward bevel gear 54*a* and a reverse bevel gear 54*b* connected to and rotated by the driveshaft 42, and a clutch 54*c* that enables the propeller shaft 56 to engage with either the bevel gear 54*a* or the reverse bevel gear 54*b*.

A shift electric motor 62 for driving the shift mechanism 54 is installed inside the engine cover 32, and an output shaft thereof is connectable through a reduction gear mechanism (not shown) with an upper end of a shift rod 54*d* of the shift mechanism 54. By operating the shift electric motor 62 to suitably vary position of the shift rod 54*d* and a shift slider 54*e*, the clutch 54*c* is operated to switch shift position between forward, reverse and neutral.

When the shift position is forward or reverse, rotation of the driveshaft 42 is transmitted through the shift mechanism 54 to the propeller shaft 56, whereby the propeller 60 is rotated to produce thrust in the forward or rearward direction of the hull 12. Direction of travel of the hull 12 when the shift position is forward is the direction indicated by arrow F in FIG. 2. Moreover, a battery or other power supply unit (not illustrated) attached to the engine 30 of the outboard motor 10 supplies operating power to energizing circuits (not shown) of the electric motors 24, 40 and 62.

Turning next to an explanation of sensors with reference to FIG. 3, a throttle position sensor 66 disposed near the throttle valve 38 shown in FIG. 2 produces an output proportional to opening angle of the throttle valve 38 (throttle opening angle). A shift position sensor 68 disposed near the shift rod 54*d* shown in FIG. 2 outputs a signal corresponding to shift position (neutral, forward or reverse), and a neutral switch 70 is also installed that outputs an ON signal when the shift position is neutral and an OFF signal when the shift position is forward or reverse.

A crankangle sensor 74 attached near the crankshaft 52 of the engine 30 shown in FIG. 2 outputs a pulse signal indicative of engine speed every predetermined crank angle. This signal is inputted to an ECU 84 and used to measure engine speed.

Further, a driveshaft rotational speed sensor 76 attached near the driveshaft 42 outputs a signal indicative of rotational speed of the driveshaft 42. A trim sensor (rotation angle sensor) 78 disposed near the swivel case 14 produces an output corresponding to trim angle of the outboard motor 10.

The outputs of the aforesaid sensors and switch are sent to an electronic control unit (ECU) 84 mounted on the outboard motor 10. The ECU 84, which is a microcomputer having a CPU (processor) 84*a*, ROM 84*b*, RAM 84*c* and other components, is disposed (mounted) inside the engine cover 32 of the outboard motor 10 and integrally controls operation of the outboard motor 10.

As shown in FIG. 1, a steering wheel 92 rotatable by the boat operator is installed near an operator's seat 90 of the hull 12. A steering angle sensor 94 attached to a shaft (not shown) of the steering wheel 92 outputs a signal corresponding to steering angle of the steering wheel 92 operated by the boat operator.

A shift-throttle lever 98 installed to be operable by the boat operator is provided on a dashboard 96 at the operator's seat 90. The shift-throttle lever 98, which is swingable back and forth from an initial position, is used by the boat operator to input shift commands and engine speed regulation commands. A lever position sensor 100 attached near the shift-throttle lever 98 outputs a signal corresponding to the position to which the boat operator operates the shift-throttle lever 98.

A power tilt-trim switch 102 provided near the operator's seat 90 to be manually operable by the boat operator for inputting outboard motor 10 tilt angle and trim angle adjust instructions outputs signals indicative of the outboard motor 10 tilt angle up/down and trim angle up/down commands input by the boat operator.

Outputs of the steering angle sensor 94, lever position sensor 100 and power tilt-trim switch 102 are also inputted to the ECU 84. Based on the outputs of the aforesaid sensors and switch, the ECU 84 controls operation of the different electric motors. As a result, steering is performed in accordance with steering angle of the steering wheel 92 by rotating the outboard motor 10 around a vertical axis using the swivel shaft 22 as the steering axis. Further, trim angle is adjusted by operating the power tilt-trim unit 26 in accordance with the output of the power tilt-trim switch 102.

Although the foregoing explanation of the outboard motor 10 relates to the first outboard motor 10A, the same also applies to the second outboard motor 10B. The ECU 84 of the first outboard motor 10A and the ECU 84 of the second outboard motor 10B are wire-connected (as indicated by a one-dot-dashed line in FIG. 1) and configured to be communicable with each other.

In addition, navigation instruments 104 including gauges and meters indicating running speed and so forth and a compass and the like are provided on the dashboard 96 near the operator's seat 90. An apparatus main unit 202, a display 204, and an indicator 206 and other components constituting the navigation assist apparatus according to the present invention are also provided. The navigation assist apparatus is explained in detail later.

Figure 4:
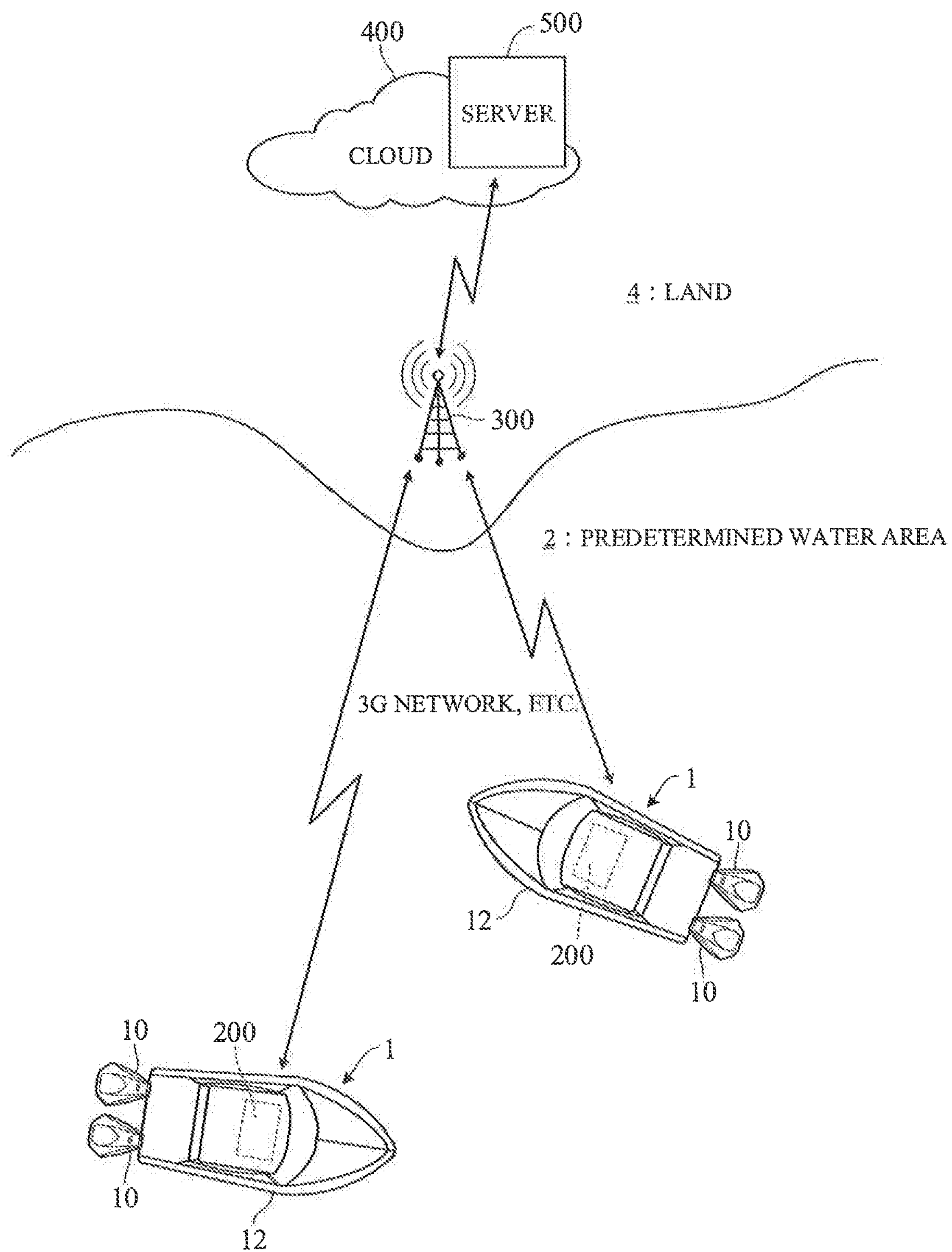
FIG. 4 is a conceptual diagram for explaining the navigation assist system according to this embodiment of the present invention.

FIG. 4 is a conceptual diagram for explaining the navigation assist system according to this embodiment of the present invention.

In the embodiment shown in FIG. 4, two or more boats 1, including the subject boat, are assumed to be mainly taxi-boats, pleasure boats and similar freely navigating in a predetermined water area 2 on the ocean or lake. In this example, the boats 1 are the small boats like motorboats explained with reference to FIGS. 1 to 3, but they are not limited to motorboats fitted with dual outboard motors 10 and can instead be boats fitted with a single outboard motor or with three outboard motors. Other configuration features are also not limited to those described in the foregoing. Moreover, the motorboats 1 need not be of identical structure. They can also include small fishing boats and the like.

The boats 1 are all fitted with navigation assist apparatuses 200 for working this invention. And the navigation assist apparatuses 200 of the boats 1 and the server 500 on a cloud (internet) 400 with which they can communicate through a base station 300 set up on land 4 constitute the navigation assist system.

The navigation assist apparatuses 200 and the server 500 communicate using a 3G or other wireless communication network. The 3G network is a communication network suitable for data communication by a third-generation mobile telephone system, smartphone or similar. A 3.5G network or 3.9G network enabling faster communication is also usable. Other communication systems can also be used, while over relatively short distances data communication can be performed by, for example, wireless LAN (such as Wi-Fi) complying to IEEE 802.11 series standards or to IEEE 802.15.11 (Bluetooth) standards.

When the steering wheel 92 is turned right, the outboard motor 10 turns right with respect to the vertical axis as shown by the arrow R in FIG. 4 and the hull 12 of the boat 1 turns in the same direction. On the other hand, when the steering wheel 92 is turned in the opposite direction, the outboard motor 10 turns left as shown by the arrow L.

In the case of a vehicle driving on land, the response when encountering a dangerous situation is usually sudden braking. In the case of a boat, however, much time is required to decelerate, so that when an obstacle is sighted ahead, damage owing to the outboard motor 10 hitting the obstruct is usually avoided by turning the boat 1 sharply (hereinafter referred to as "sharp-turn"). a sharp-turn of the boat 1.

So in this navigation assist system, when any boat 1 shown in FIG. 4 makes a sharp-turn, such is detected by the navigation assist apparatus 200 and the boat's own position data at this time are transmitted to the server 500 as sharp-turn data. The server 500 receives and collects the sharp-turn position data transmitted from every boat 1. Based on data accumulated in this manner, the server 500 determines danger level in every coordinate domain of a predetermined mesh-like divided water area and updates and saves the obtained danger level data. As a water area in which sharp-turn is rare can be considered quite safe and one in which sharp-turn is frequent can be considered quite dangerous, the safety of the water area concerned can be grasped.

The navigation assist apparatus 200 of each boat 1 downloads this danger level data from the server 500 and displays the data on the display 204 (shown in FIG. 1), and when the subject boat approaches a high danger region, it alerts or warns the operator by, for instance, flashing the indicator 206 or sounding a buzzer. As a result, the operator can navigate cautiously to avoid inadvertent grounding, and prevent, or at least minimize, damage and other harm to the hull 12 or the outboard motor(s) 10.

The danger level data from the server 500 improve in accuracy with increasing number of boats participating in the system and with increasing time in service because the amount of sharp-turn data accumulated increases in proportion. There now follows a detailed explanation of the configurations and functions of the navigation assist apparatus 200 and server 500 of this navigation assist system.

Figure 5:
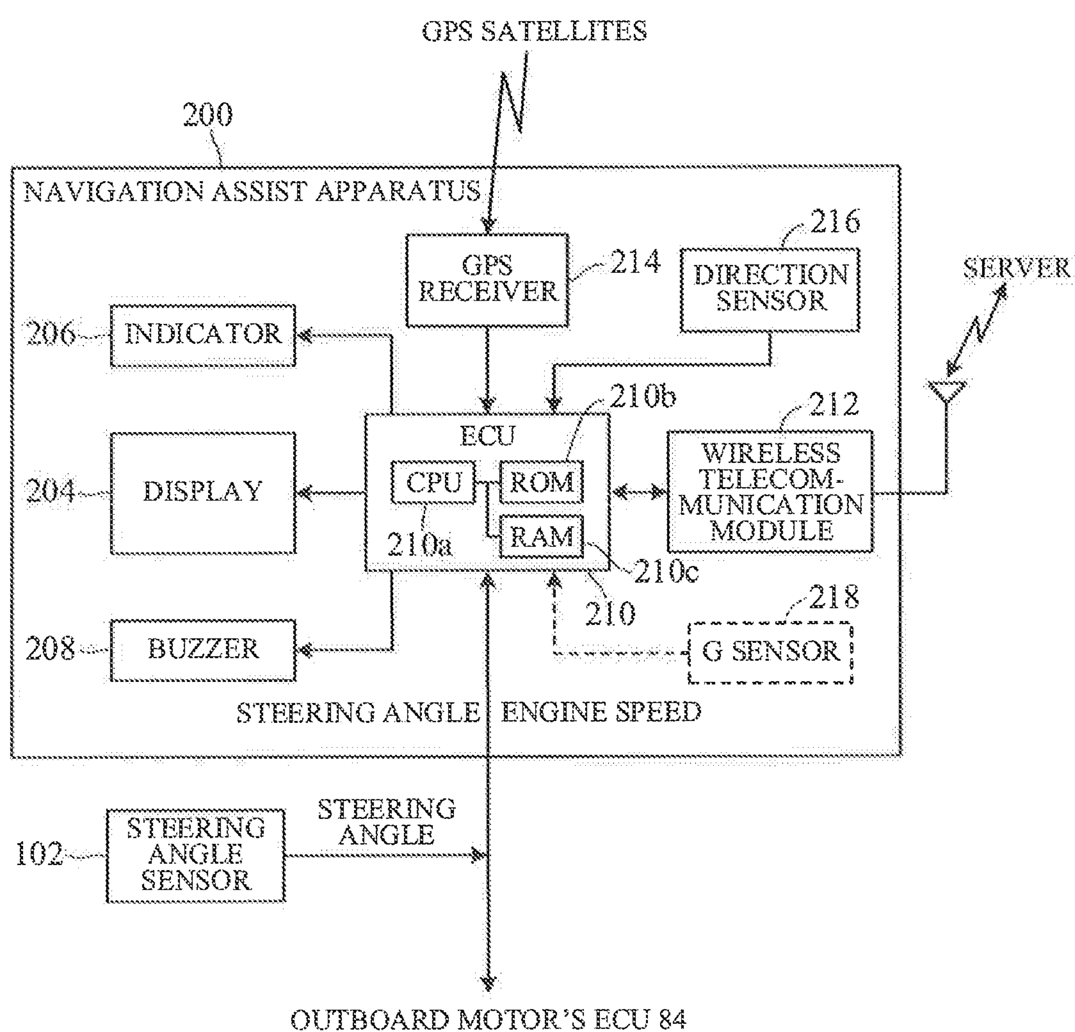
FIG. 5 is a block diagram showing a hardware configuration example of a navigation assist apparatus mounted on the boat(s) of FIGS. 1 and 4.
Figure 6:
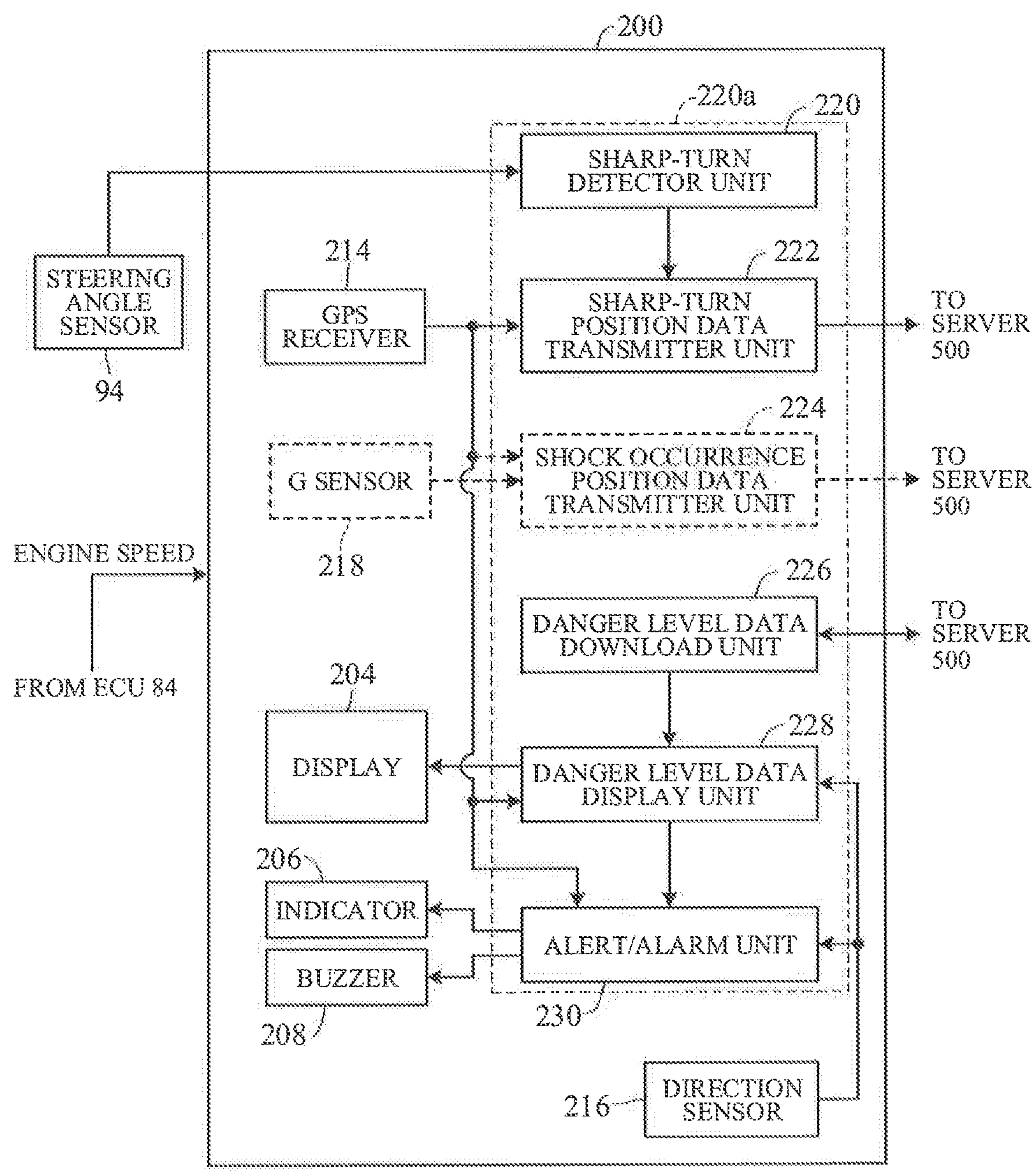
FIG. 6 is a block diagram showing a functional configuration example of the navigation assist apparatus shown in FIG. 5.
Figure 7:
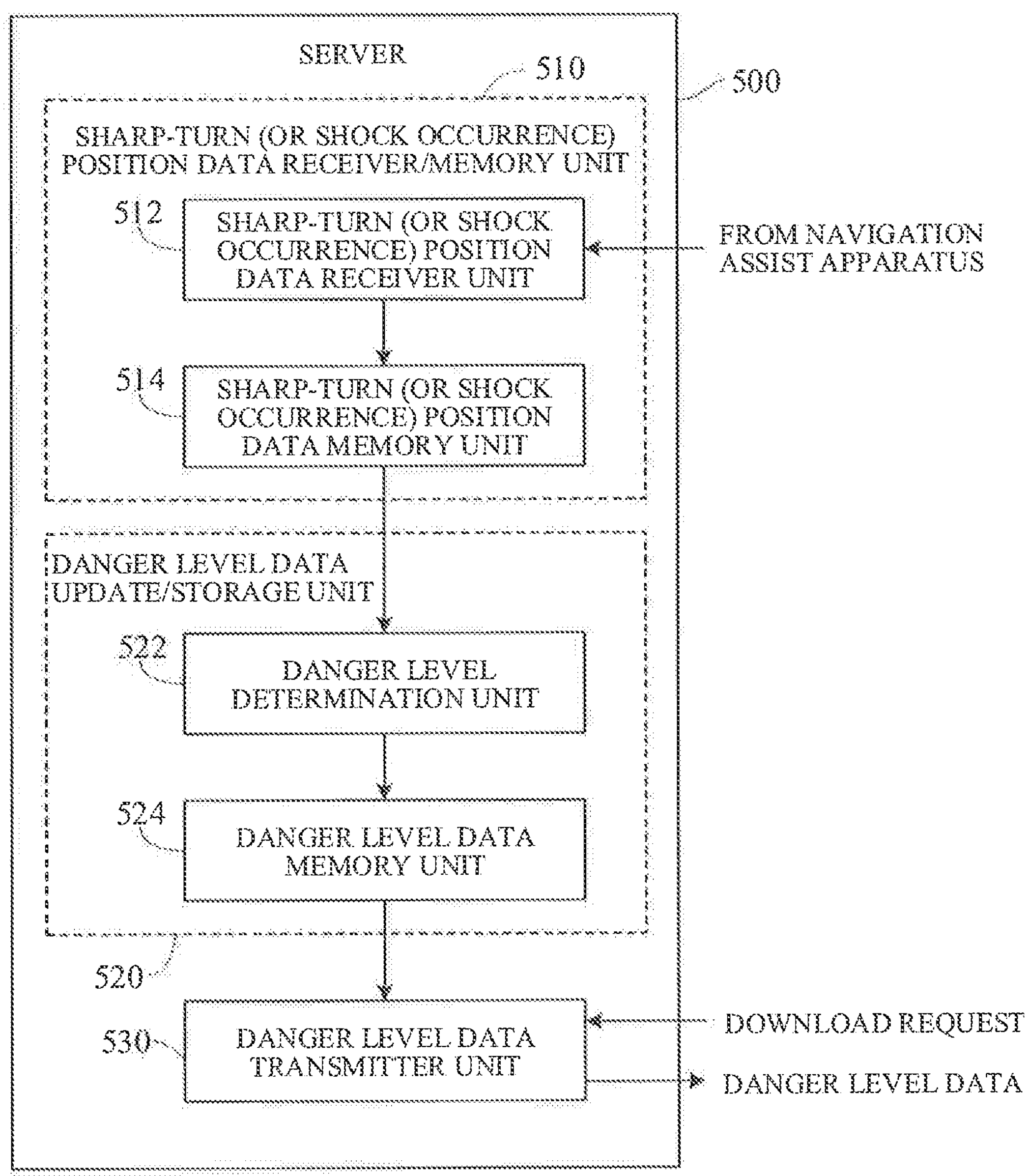
FIG. 7 is a block diagram of a functional configuration example of a server shown in FIG. 4.

The configurations and functions of the navigation assist apparatus 200 and server 500 used implement this invention are explained in detail in the following using FIGS. 5 to 9. FIG. 5 is a block diagram showing a hardware configuration example of the navigation assist apparatus 200 mounted on the boat(s) of FIGS. 1 and 4; FIG. 6 is a block diagram showing a functional configuration example of the navigation assist apparatus 200 shown in FIG. 5; and FIG. 7 is a block diagram of a functional configuration example of the server 500 shown in FIG. 4.

Figure 8:
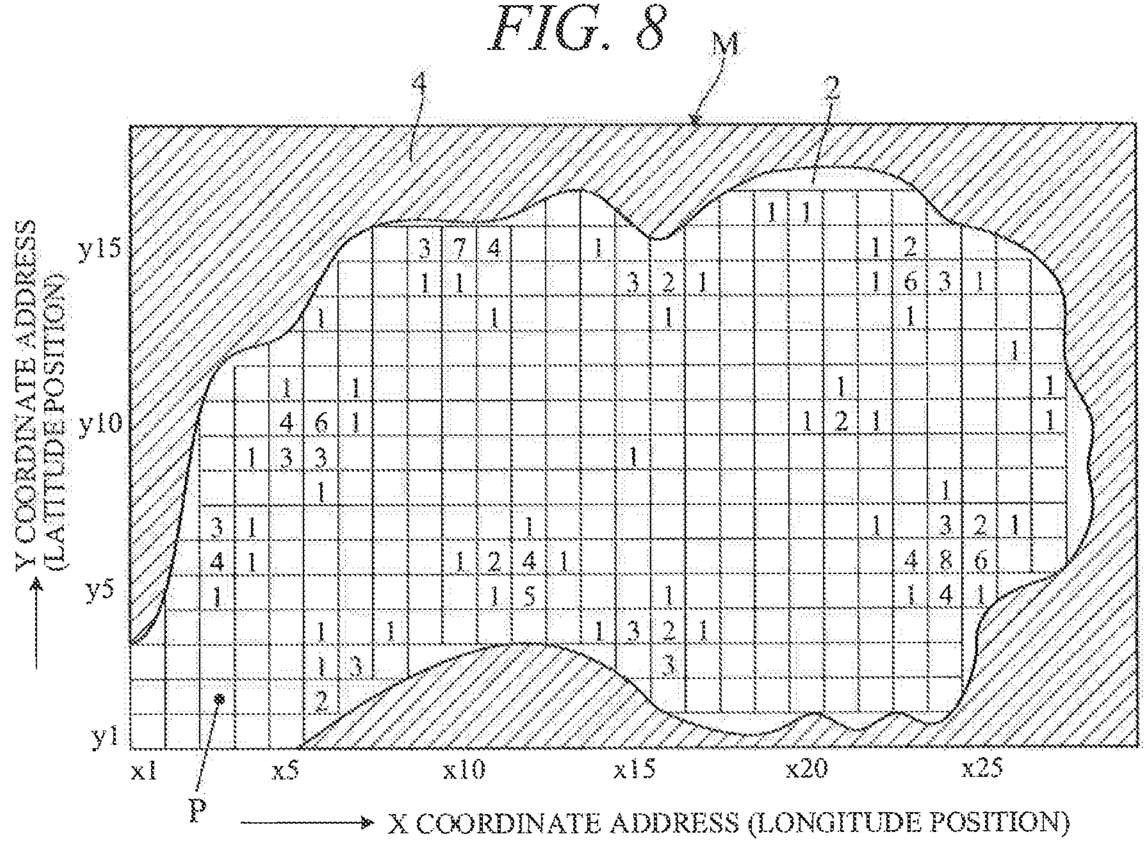
FIG. 8 is an explanatory diagram showing an example of division of a predetermined water area into mesh-like coordinate domains.
Figure 9:
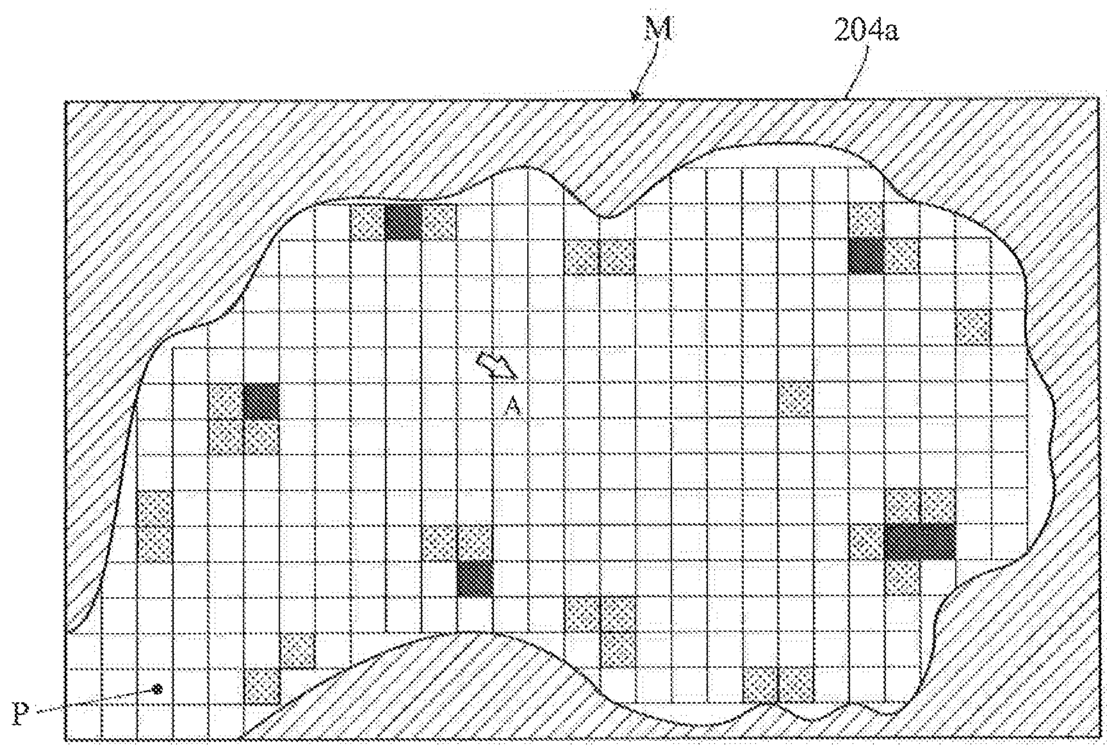
FIG. 9 is an explanatory view showing an example of displaying danger level data in coordinate domain units on a map displayed on a display screen.

FIG. 8 is an explanatory diagram showing an example of division of a predetermined water area into mesh-like coordinate domains; and FIG. 9 is an explanatory view showing an example of displaying danger level data in coordinate domain units on a map displayed on a display screen.

As shown in FIG. 5, the navigation assist apparatus 200 is equipped with an electronic control unit (ECU) 210 and a wireless telecommunication module 212, and at least these are installed in the apparatus main unit 202 shown in FIG. 1 and interconnected to enable exchange of signals and data therebetween. Like the ECU 84 of the outboard motor 10, the ECU 210 is a microcomputer having a CPU (processor) 210*a*, ROM 210*b*, RAM 210*c* and other components, and the ECU 210 integrally controls operation of the navigation assist apparatus 200. Moreover, the ECU 210 is equipped with a nonvolatile memory for storing, inter alia, map data and danger level data.

The wireless telecommunication module 212 transmits/receives data by communicating with the server 500 on the cloud 400 through the base station 300 shown in FIG. 4 using a 3G or other network and delivers received data to the ECU 210.

The ECU 210 of the navigation assist apparatus 200 and the ECU 84 of the outboard motor 10 are wire-connected to enable exchange of data and signals therebetween. The ECU 210 receives engine speed and other data from the ECU 84 and determines running speed of the subject boat. It also receives, from among the output signals of the steering angle sensor 94, those signals corresponding to sharp-turn, and determines from the signals whether sharp-turn was performed.

As inputting devices to the ECU 210, the navigation assist apparatus 200 further comprises a GPS (Global Positioning System) receiver 214, a direction sensor 216, and a G sensor (acceleration sensor) 218. Although these can be located in the apparatus main unit 202 as indicated in FIG. 1, they can instead be disposed at suitable location(s) on the hull 12 or inside the boat. Although the G sensor 218 denoted by broken line is preferably provided on the outboard motor 10, it can be omitted.

The GPS receiver 214 receives and inputs to the ECU 210 GPS signals representing position data sent from GPS satellites. The ECU 210 can therefore ascertain the current position of the subject boat. The ECU 210 can further ascertain the direction (forward direction) of the subject boat from signals received from the direction sensor 216.

As devices receiving outputs from the ECU 210, the navigation assist apparatus 200 further comprises the display 204 and indicator 206 shown in FIG. 1, and a buzzer 208 provided in the apparatus main unit 202 or at a suitable location in the boat. By using these, the ECU 210 can display danger level data downloaded from the server 500 and issue an alert or alarm when the subject boat approaches a high-danger region.

FIG. 6 represents the functions of the ECU 210 and wireless telecommunication module 212 of the navigation assist apparatus 200 of FIG. 5 in the form of a functional blocks and also shows devices inputting to and receiving outputs from the ECU 210. As shown in FIG. 6, the navigation assist apparatus 200 comprises a sharp-turn detector unit 220, a sharp-turn position data transmitter unit 222, a shock occurrence position data transmitter unit 224, a danger level data download unit 226, a danger level data display unit 228, and an alert/alarm unit 230.

Although not indicated in the drawings, a function is also incorporated that determines based on engine speed and other data input from the ECU 84 whether the subject boat (boat 1) is running within a predetermined speed range. The reason for providing this function is that running at least a certain speed is a necessary condition for preventing misoperation when, for example, trim operation of the outboard motor 10 is being checked during preparation before the boat 1 starts navigating or when a shock occurs during mooring owing to collision with a nearby boat or dock. The shock occurrence position data transmitter unit 224 indicated by broken line can be omitted.

The sharp-turn detector unit 220 detects the fact of the subject boat (boat 1) being turned sharp when the subject boat (boat 1) is running within the predetermined speed range. The sharp-turn position data transmitter unit 222 is responsive to detection of sharp-turn by the sharp-turn detector unit 220 for detecting position data of the subject boat (boat 1) from GPS signals received from the GPS receiver 214 and transmitting the sharp-turn position data to the server 500.

When the G sensor 218 provided on the subject boat (boat 1) detects shock of or exceeding a predetermined value, the shock occurrence position data transmitter unit 224 transmits position data of the subject boat to the server 500 as shock occurrence position data. Since when an obstacle is not avoided, a shock acts on the hull 12 or outboard motor 10 striking the obstacle, so that this is to report the fact of shock occurrence and the occurrence position data to the server 500.

The danger level data download unit 226 downloads from the server 500 danger level data indicating danger level of individual coordinate domains of a predetermined water area 2 divided into mesh-like coordinate domains (small square regions) P, as shown, for example, in FIG. 8. The danger level data are explained later.

The danger level data display unit 228 displays downloaded danger level data on a screen 204*a* of the display 204 in coordinate domain P units on a predetermined water area map (nautical chart) M, as shown in FIG. 9. In FIG. 9, blank arrow A indicates current position and forward direction of the subject boat (boat 1). Coordinate regions displayed in solid black (in an actual application, in red, for example) indicate very high danger regions, coordinate regions displayed in halftone black (actually in yellow, for example) indicate somewhat high danger regions, and coordinate regions displayed blank (actually in blue, for example) indicate safe regions of low danger.

Data divided into coordinate regions in the same way as the map data (electronic nautical chart data) of the water area 2 are stored in advance in the nonvolatile memory of the server 500 and the nonvolatile memory of the ECU 210 of the navigation assist apparatus 200 of each boat 1. Alternatively, the navigation assist apparatuses 200 of the boats 1 can download and display map data stored in the server 500.

The mesh lines (separator lines) need not be displayed on the map M. Although not shown in FIG. 9, it is further possible to display water depth contours, and to represent safe regions in different shades of blue that grow darker with increasing water depth. Other display possibilities including enlarging a region centered on the location of the subject boat and/or turning the blank arrow A indicating forward direction of the subject boat in FIG. 9 to point upward in the y-axis direction.

When during navigation the subject boat (boat 1) approaches to within a predetermined distance of a coordinate region of a danger level, that, according to the aforesaid danger level data, is equal to or greater than a prescribed level, the alert/alarm unit 230 informs the operator by displaying an alert or sounding an alarm, or both. Details are explained later.

The configuration of the server 500 is explained next. The server is a computer equipped with a large capacity nonvolatile memory. As shown in FIG. 7, the server 500 is functionally configured to comprise a sharp-turn (or shock occurrence) position data receiver/memory unit 510, a danger level data update/storage unit 520 and a danger level data transmitter unit 530.

The sharp-turn (or shock occurrence) position data receiver/memory unit 510 comprises a sharp-turn (or shock occurrence) position data receiver unit 512 and a sharp-turn (or shock occurrence) position data memory unit 514. The sharp-turn (or shock occurrence) position data receiver unit 512 receives from the navigation assist apparatus 200 installed in every boat 1 navigating in the predetermined water area sharp-turn position data or shock occurrence position data transmitted when, during low-speed running, the boat 1 is turned sharply or when the outboard motor experiences occurrence of a shock equal to or greater than a prescribed value.

The sharp-turn (or shock occurrence) position data memory unit 514 stores sharp-turn (or shock occurrence) position data received by the sharp-turn (or shock occurrence) position data receiver unit 512 in associated coordinate domains P created by mesh-like division of the water area 2 on the map M, as shown in FIG. 8.

In the example shown in FIG. 8, longitude is plotted on the x-axis and latitude on the y-axis and the map is sliced in both directions at predetermined intervals. The resulting coordinate domains P indicated as small squares (meshes) are assigned x and y coordinate addresses. A nonvolatile memory region is set aside for storing a successively incremented number of sharp-turn and/or shock occurrences taking place in each coordinate domain P. The area of the mesh-like coordinate domains P is assumed to be between around 1 m×1 m and 10 m×10 m, for example. Although, as discussed later, positions of regions in which danger level is determined can be more accurately ascertained in proportion as size of the domains decreases, more memory regions become necessary for storing the successively incremented number of sharp-turn and shock occurrences, so that more time is needed to determine danger level and the number of memory regions necessary for storing determination results increases.

Every time the sharp-turn (or shock occurrence) position data receiver unit 512 receives sharp-turn (or shock occurrence) position data, it increments (+1) and stores the number of sharp-turn and/or shock occurrences in the memory region associated with the coordinate region including the position according to the position data. In FIG. 8, numerals appearing in the coordinate domains P indicate the number of sharp-turn and/or shock occurrences in the coordinate regions up to the current time. A coordinate region without a numeral is one in which the number of sharp-turn and/or shock occurrences is 0 up to the current time.

The danger level data update/storage unit 520 comprises a danger level determination unit 522 and a danger level data memory unit 524. The danger level determination unit 522 determines danger level of every coordinate region based on the sharp-turn (or shock occurrence) position data stored in the coordinate regions by the sharp-turn (or shock occurrence) position data memory unit 514, i.e., the number of sharp-turns and/shock occurrences of the individual coordinate regions.

In the case shown in FIG. 8, for example, danger level is defined as “Low” when number of sharp-turn and/or shock occurrences is 0-1, as “Medium” when 2-4, and as “High” when 5 or greater. The danger level data memory unit 524 has nonvolatile memory regions set aside for storing danger levels of the individual coordinate regions, and the danger level determination unit 522 stores determined danger levels of the coordinate regions therein as digital values. When a determination result differs from the preceding one, the stored value is rewritten to update the danger level data.

When the danger level of the individual coordinate regions is determined by the cumulative value of the number of sharp-turn and shock occurrences in this manner, cumulative value of number of occurrences increases overall as time in service grows longer, and the number of coordinate regions with high danger level values increases as a result. It is therefore advisable to raise the danger level determination standard progressively as total value of number of occurrences in all coordinate regions stored in the sharp-turn (or shock occurrence) position data memory unit 514 increases.

Alternatively, danger level can be determined from frequency of sharp-turn or shock occurrence in each coordinate region. In this case, every time a boat participating in the system passes through a coordinate region while navigating in the predetermined water area, its navigation assist apparatus 200 transmits its passage position data to the server 500, and upon receiving the passing position data, the server 500 stores the data cumulatively as another boat passage through the coordinate region concerned. Further, for each coordinate region, it calculates occurrence frequency as ratio of number of sharp-turn and/or shock occurrences to number of boat passages, i.e., (Number of occurrences/Number of boat passages)×100(%), as of time of determination, and determines danger level from the calculated occurrence frequency.

For example, danger level is defined as "Low" when sharp-turn and/or shock occurrence frequency is less than 10%, as "Medium" when equal to or greater than 10% and less than 25%, and as "High" when 25% or greater. Taking as a concrete example a case in which the number of boat passages through a certain coordinate region in the past is 20, then when the number of sharp-turns and/or shock occurrences is 1, occurrence frequency is 5%, i.e., less than 10%, so that danger level is determined to be "Low" and when the number of sharp-turns and/or shock occurrences is 5, occurrence frequency is 25%, i.e., 25% or greater," so that danger level is determined to be "High."

The danger level data transmitter unit 530 transmits coordinate region-specific danger level data to the navigation assist apparatus 200 of a boat 1 in response to a download request from the navigation assist apparatus 200. In a case where none of the navigation assist apparatuses 200 of the boats 1 are equipped with a shock occurrence position data transmitter unit 224, the aforesaid components of the server 500 also do not take shock occurrence position data and number of shock occurrences into consideration.

Operation of aforesaid navigation assist apparatus 200 and server 500 is explained with reference to the flowcharts of FIGS. 10 to 12 in the following.

Figure 10:
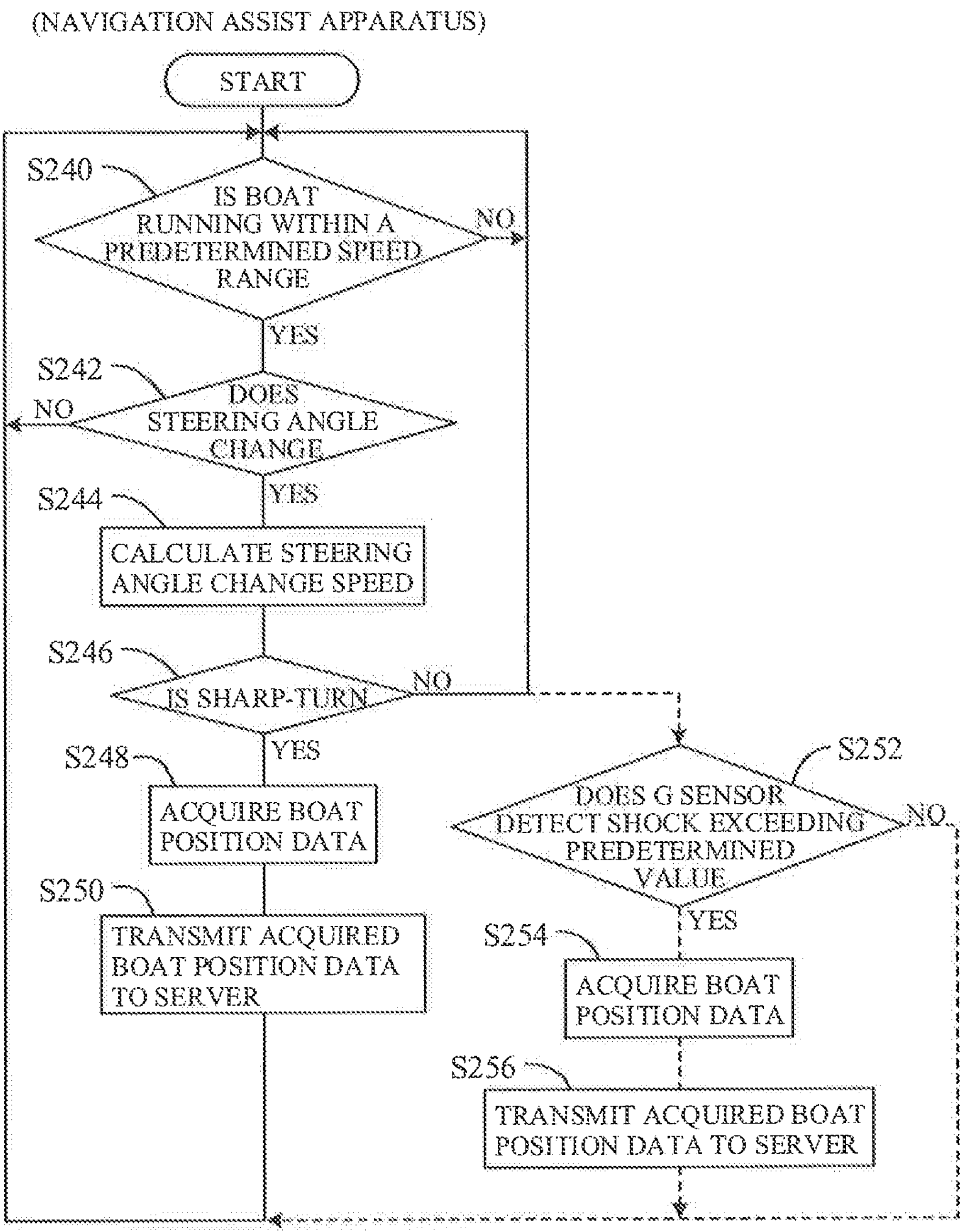
FIG. 10 is a flowchart indicating flow of processing utilizing a sharp-turn detection unit, a sharp-turn position data transmission unit and a shock occurrence position data transmission unit of a navigation assist apparatus shown in FIG. 6.
Figure 11:
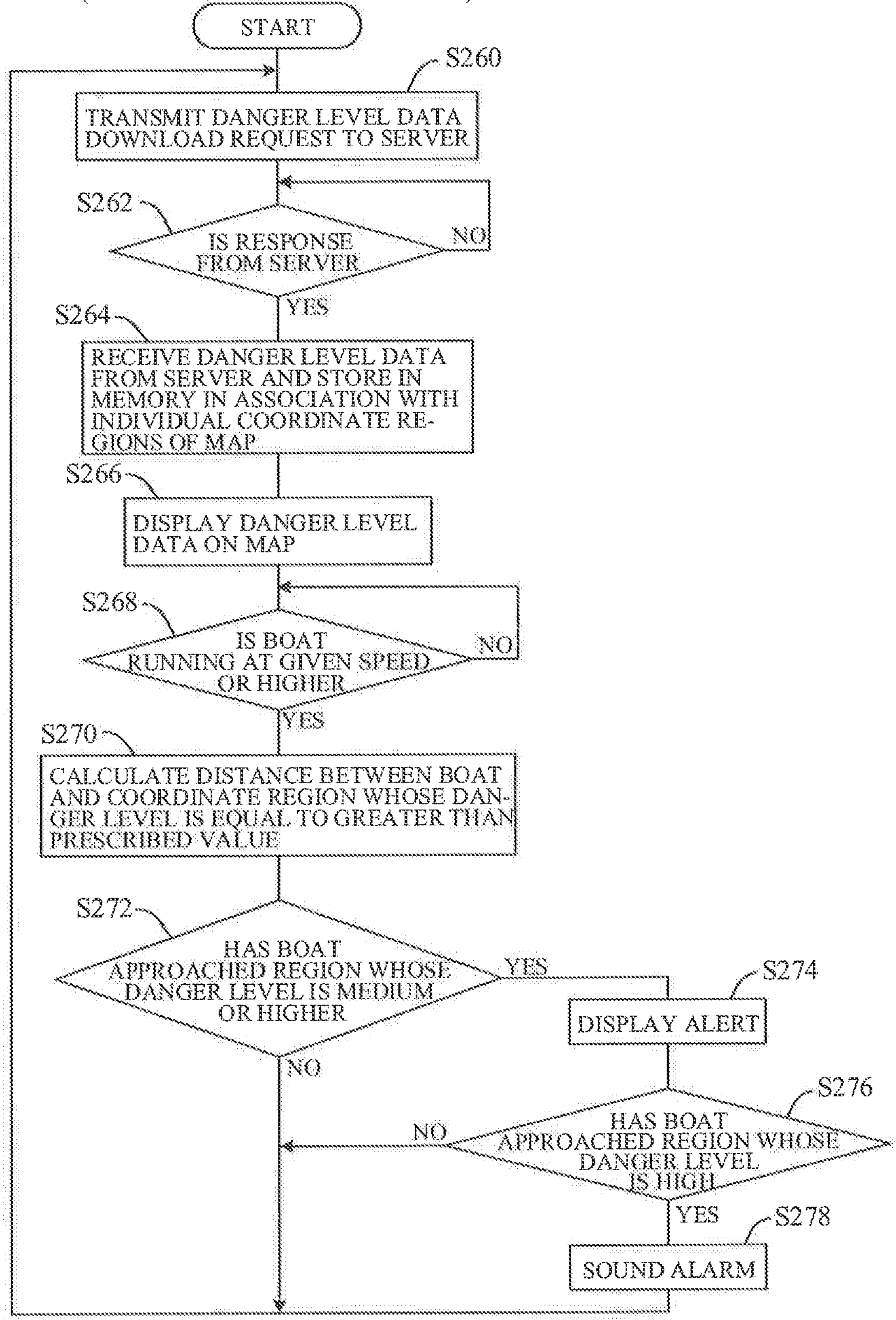
FIG. 11 is a flowchart indicating flow of processing utilizing a danger level data download unit, a danger level data display unit and an alert/alarm unit of the navigation assist apparatus shown in FIG. 6.

FIG. 10 is a flowchart indicating flow of processing utilizing the sharp-turn detector unit 220, sharp-turn position data transmitter unit 222 and shock occurrence position data transmitter unit 224 of the navigation assist apparatus 200 shown in FIG. 6, and FIG. 11 is a flowchart indicating flow of processing utilizing the danger level data download unit 226, danger level data display unit 228 and alert/alarm unit 230 of the navigation assist apparatus 200 shown in FIG. 6.

Figure 12:
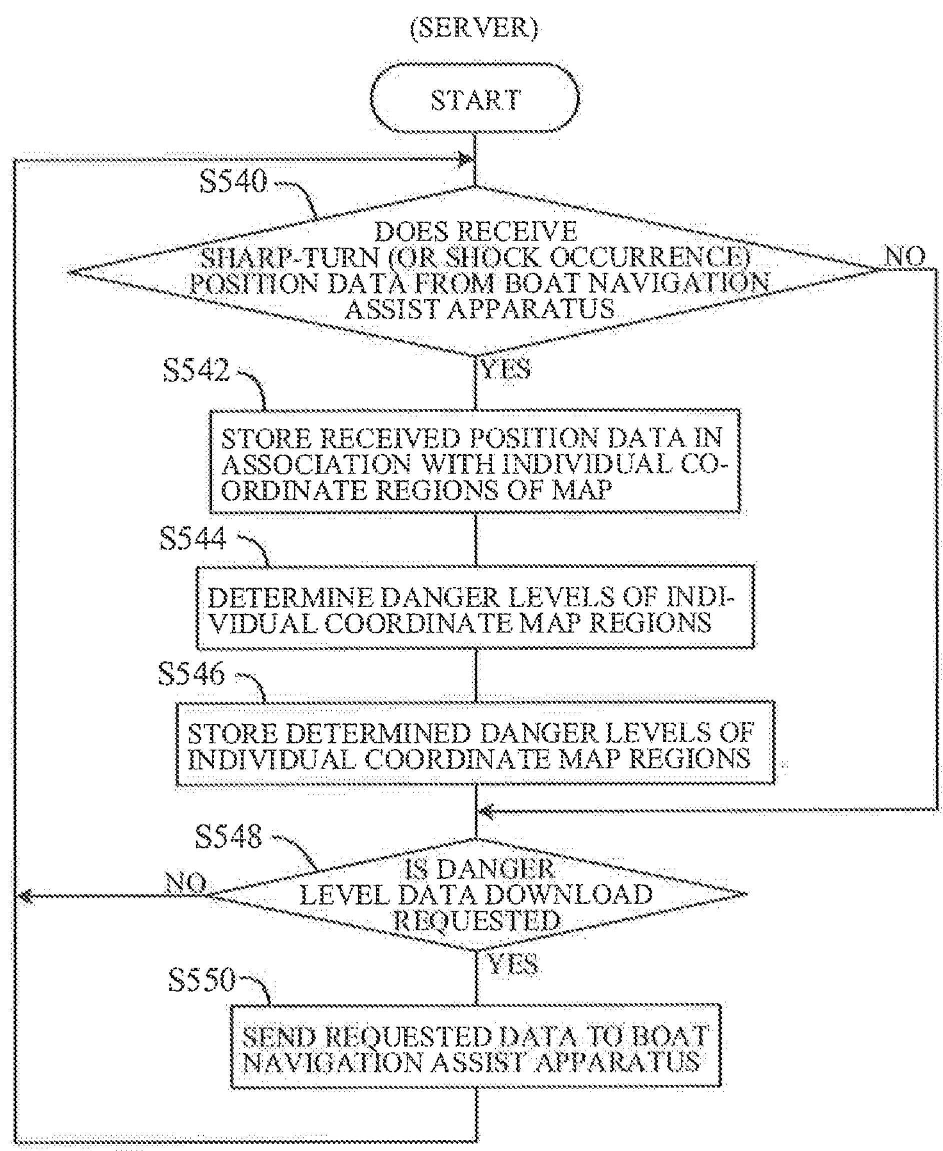
FIG. 12 is a flowchart showing flow of processing by a server shown in FIG. 7.

FIG. 12 is a flowchart showing flow of processing by the server 500 shown in FIG. 7. In the following explanation of FIGS. 10 to 12, "processing Step" is abbreviated to "S". Moreover, determination results of the processing in the respective flowchart drawings are expressed as "YES" when affirmative and "NO" when negative.

When power is supplied to the navigation assist apparatus 200, the ECU 210 shown in FIG. 5 repeatedly executes the processing shown in FIGS. 10 and 11. At this time, the processing of FIG. 10 and the processing of FIG. 11, can be executed in parallel or be executed consecutively. When executed consecutively, either the processing of FIG. 10 or the processing of FIG. 11 can be executed first. The case of executing the processing of FIG. 10 first is explained here.

When then ECU 210 starts with the processing of FIG. 10, first in S240, it is determined whether the subject boat (boat 1) is running within a predetermined speed range. As explained earlier, after the subject boat begins to run at a certain speed (e.g., 30 km/h) or faster, it needs to be running at a relatively low speed when the processing according to this invention is commenced, in order to prevent misoperation, and also because sharp-turn detection is not performed when the subject boat is planing at a high speed equal to or higher than a predetermined speed.

As boat running speed is generally a function of engine speed, whether the subject boat is running in the predetermined speed range can be determined from whether engine speed is within a predetermined speed range. Actually, however, boat speed at any given engine speed differs depending on size of the outboard motor 10 and boat 1.

So relationship between boat engine speed and boat running speed is determined in advance and the correlation data are stored in memory, or, alternatively, boat running speed is calculated from, inter alia, position change per unit time determined using position data from the GPS receiver 214 shown in FIG. 5 and forward direction data from the direction sensor 216. When running speed is within the predetermined speed range, the result in S240 is YES, and the program goes to S242, and when not within the predetermined speed range, the result in S240 is NO, and the program waits for boat running speed to enter the predetermined speed range.

In S242, presence/absence of change in steering angle is determined from, inter alia, a signal among output signals from the steering angle sensor 94. When the result is no steering angle change, the result is NO and the program returns to S240, although steering angle is repeatedly monitored so long as running speed remains in the predetermined range.

When the steering angle changes, the result in S242 is YES, and the program goes to S244, in which a steering angle change speed is calculated. This is calculated by obtaining a steering change amount per unit time. The program next goes to S246, in which it is determined whether a sharp-turn has occurred by comparing the calculated steering angle change speed is equal to or greater than a prescribed value. When the calculated value is smaller than the prescribed value, the result is NO, the processing from S242 is repeated.

On the other hand, when the calculated value is equal to or greater than the prescribed value, the result is YES, the program goes to S248, in which position data of the subject boat are acquired from signals received by the GPS receiver 214 at that time. And in S250, the acquired position data are transmitted to the server 500 as sharp-turn position data.

In a case where the G sensor 218 and shock occurrence position data transmitter unit 224 shown in FIG. 6 are installed, the program does not return to S242 when the result in S246 is NO but, as indicated by broken flow lines in FIG. 10, advances to S252, in which it is determined whether the G sensor detected shock of or exceeding a predetermined value, i.e., it is determined whether detected acceleration value in the direction of at least one axis among three axes of the G sensor is equal to or greater than the predetermined valued, and when shock of or exceeding the predetermined value is detected, the program goes to S254.

In S254, position data of the subject boat are acquired in the same way as in S248. And in S256, the acquired position data are transmitted to the server 500 as shock occurrence position data. Thereafter, or when the result in S252 is NO, and after sharp-turn position data are transmitted to the server 500 in S250, the program either returns to S240 and repeats the aforesaid processing or consecutively executes the processing of FIG. 11 and then returns to S242

The processing of FIG. 12 by the server 500 is explained next, before moving into an explanation of the processing of FIG. 11 by the navigation assist apparatus 200.

A program of the server 500 repeatedly executes the processing shown in FIG. 12, and first, in S540, it is determined whether sharp-turn (or shock occurrence) position data were received from the navigation assist apparatus 200 of any boat 1, and when the result is YES, goes to S542, and when NO, to S548.

In S542, the sharp-turn (or shock occurrence) position data are stored in memory in association with individual coordinate regions (meshes) of the map. In other words, as explained earlier with reference to FIG. 8, successively incremented (+1) numbers of sharp-turn and/or shock occurrences are stored in a nonvolatile memory at nonvolatile memory regions corresponding to coordinate domains P including positions on the map M contained in the received position data.

Next, in S544, danger levels of the individual coordinate regions (meshes) are determined. Assume, for example, that numbers of sharp-turn and/or shock occurrences like the numerical values indicated in FIG. 8 are stored in memory regions corresponding to the coordinate domains P on the map M shown in FIG. 8. In FIG. 8, indication of a numerical value is omitted when the number of occurrences is 0. When number of occurrences is less than a first prescribed value, danger level is defined as "Low," when equal to or greater than the first prescribed value and less than a second prescribed value, danger level is defined as "Medium," and when equal to or greater than the second prescribed value, danger level is defined as "High." Second prescribed value is greater than first prescribed value.

For example, when first prescribed value is defined as "2" and second prescribed value as "5," danger level of a coordinate region is "Low" when number of occurrences is less than 2, namely 0-1, is "Medium" when number of occurrences is 2-4, and is "High" when number of occurrences is 5 or greater. Danger level ranking need not be limited to three levels. And the prescribed values can be set to larger values in accordance with increasing data accumulation (total number of occurrences in all coordinate regions).

Next, in S546, the danger level data of every coordinate region (mesh) stored in the nonvolatile memory up to the preceding cycle are updated based on the result of the determination in S544, and stored. The danger level data are stored as digital values (danger level data) indicating ranking of danger level by magnitude. For this, it suffices to rewrite the danger level data of only the coordinate regions whose danger level ranking changed.

Next, in S548, presence/absence of a danger level data download request is determined. When no download request exists, the result is NO and the program returns to S540 to repeat the aforesaid processing. When a download request from the navigation assist apparatus 200 of any boat 1 exists, the result in S548 is YES and the program goes to S550. Then a response is sent to the navigation assist apparatus 200 that sent the request and coordinate region-specific danger level data are sent thereto. The program then returns to the initial S540 and the aforesaid processing is repeated.

Next follows an explanation of the processing shown in FIG. 11 performed mainly by the ECU 210 of the navigation assist apparatus 200. When this processing starts, first in S260, a danger level data download request is transmitted to the server 500 along with an attached self-identifying ID.

Next, in S262, the program waits for a response from the server 500, determines YES (received) when one arrives, and then goes to S264. In S264, danger level data coming in from the server 500 are received, and the received danger level data are stored in nonvolatile memory in association with individual coordinate regions (meshes) of the map. Any preceding cycle danger level data already stored in memory are rewritten and updated. For this, it suffices to rewrite the danger level data of only the coordinate regions whose danger level ranking changed.

Next, in S266, the danger level data are displayed on the map. Namely, as shown in FIG. 9, color-coded danger levels are displayed in coordinate regions whose danger level is equal to or greater than a prescribed value. In this example, the server 500 displays coordinate regions whose danger levels were determined in the foregoing manner to be "High" in red (black in FIG. 9) and coordinate regions whose danger levels were determined to be "Medium" in yellow (halftone black in FIG. 9). Coordinate regions whose danger levels are "Low" are not specially displayed but shown in the same blue (white in FIG. 9) as in an ordinary nautical chart.

Then in S268, as an extra precaution, it is determined whether the subject boat 1 is running at a given speed (e.g., 30 km/h) or higher (or just running) and when running at or faster than the given speed (or just running), the program goes to S270, and when not running at the given speed or faster, waits until the boat speed reaches the given speed or faster. Running at a given speed or faster can be defined to include simply running.

In S270, distance in forward direction between the subject boat's position and any coordinate region whose danger level is equal to or higher than a prescribed value (first prescribed value in the foregoing example; i.e., a yellow or red coordinate region) is calculated. This distance is calculated using subject boat position data from the GPS receiver 214 and subject boat forward direction data from the direction sensor 216.

Next, in S272, it is determined whether the subject boat has closely approached a region whose danger level is Medium or higher. When the distance calculated in S270 comes to within a predetermined distance set in advance, this determination becomes YES (close approach), and the program goes to S274 to display an alert. For example, the indicator 206 is flashed. The predetermined distance mentioned here is preferably varied based on subject boat running speed or engine speed.

In addition, it is determined in S276 whether the subject boat has closely approached a region whose danger level is High, and when the result is YES (close approach), the program goes to S278 to produce an audible alarm. For example, the buzzer 208 is sounded. Or a vocal alarm such as "Approaching dangerous region!" can be announced. Or an alarm can be made by an electronic generated sound. These audible alarm methods can be combined. And the alert display can be continued.

The alert display and alarm can be continued until distance between the subject boat and region of Medium or High danger level comes to reach or exceed a set distance. The processing for this is not shown in FIG. 11. The program then returns to the initial S260 and the aforesaid processing is repeated. When the processing of FIG. 10 and the processing of FIG. 11 are executed consecutively, the program returns to S202 of FIG. 10.

As stated above, the embodiment is configured to have a navigation assist system having; a plurality of navigation assist apparatuses (200) installed on boats (1) each fitted with an outboard motor (10) to be able to navigate in a predetermined water area (2), and a server (500) configured to communicate with the navigation assist apparatuses (200); wherein each of the navigation assist apparatuses (200) comprises: a sharp-turn detector unit (220) configured to detect sharp-turn of one of the boats (1, i.e., the subject boat 1) that navigates in the predetermined water area within a predetermined speed range; a sharp-turn position data transmitter unit (222) configured to detect a position data of the one of the boats (1) as a sharp-turn position data when the sharp-turn detector unit (220) detects the sharp-turn of the one of the boats (1) and send the sharp-turn position data to the server (500); a danger level data download unit (226)

configured to download from the server (500) danger level data indicating danger level of individual coordinate domains of the predetermined water area (2) divided into mesh-like coordinate domains (P); a danger level data display unit (228) configured to display the downloaded danger level data on a map (M) of the predetermined water area (2) in association with coordinate regions corresponding to the coordinate domains; and an alert/alarm unit (230) configured to inform an operator of each of the boats (1) by displaying an alert or sounding an alarm, when the each of the boats approaches to within a predetermined distance of one of the coordinate regions on the map whose danger level of the danger level data is equal to or greater than a prescribed level; wherein the server (500) comprises: a sharp-turn position data receiver/memory unit (510, 512, 514) configured to receive the sharp-turn position data from the navigation assist apparatuses (200) installed on the boats (1) and stores the received sharp-turn position data in association with the individual coordinate domains of the predetermined water area (2) divided into mesh-like coordinate domains (P); a danger level data update/storage unit (520, 522, 524) configured to determine danger level of individual coordinate regions based on the sharp-turn position data stored in association with the individual coordinate domains, and update and store the danger level data; and a danger level data transmitter unit (530) configured to transmit the danger level data of the individual coordinate regions to the navigation assist apparatuses (200) in response to the download request made by the navigation assist apparatuses (200).

With this, it becomes possible to provide a navigation assist system adapted to assist navigation by appropriately producing alerts and/or alarms consistent with actual navigation circumstances of a small boat in a predetermined water region when the subject boat approaches a dangerous region, and a navigation assist apparatus and a server of the system.

Specifically, in this navigation assist system, when any boat 1 shown in FIG. 4 is turned sharply while running at low speed (speed within a predetermined range), such is detected by the navigation assist apparatus 200 and the boat's own position data at this time are transmitted to the server 500 as sharp-turn data. The server 500 receives and collects the sharp-turn position data transmitted from every boat 1. Based on data accumulated in this manner, the server 500 determines danger level in every coordinate domain of a predetermined mesh-like divided water area and updates and saves the obtained danger level data. As a water area in which sharp-turn is rare can be considered quite safe and one in which sharp-turn is frequent can be considered quite dangerous, the safety of the water area concerned can be grasped.

The navigation assist apparatus 200 of each boat 1 downloads this danger level data from the server 500 and displays the data on the display 204 (shown in FIG. 1), and when the subject boat approaches a high danger region, it alerts or warns the operator by, for instance, flashing the indicator 206 or sounding a buzzer. As a result, the operator can navigate cautiously to avoid inadvertent grounding, and prevent, or at least minimize, damage and other harm to the hull 12 or the outboard motor(s) 10.

In the navigation assist system, the danger level data display unit (228) is configured to display the downloaded danger level data on the map (M) in colors, and the alert/alarm unit (230) is configured to inform the operator by displaying an alert when the danger level of the danger level data is greater than a first prescribed value of the prescribed level, while informing the operator by sounding an alarm when the danger level of the danger level data is greater than a second prescribed value which is greater than the first prescribed value of the prescribed level.

In the navigation assist system, the navigation assist apparatuses (200) includes; a shock occurrence position data transmitter unit (224) configured to transmit position data of one of the boats (1) concerned to the server (500) as shock occurrence position data, when a G sensor (218) provided on the one of the boats (1) detects a shock exceeding a predetermined value, and the sharp-turn position data receiver/memory unit (510, 512, 514) is configured to add the received shock occurrence position data to the received sharp-turn position data stored in association with the individual coordinate domains.

Further, the embodiment is configured to have a navigation assist apparatus (200) installed on boats (1) each fitted with an outboard motor (10) to be able to navigate in a predetermined water area (2), comprising: a sharp-turn detector unit (220) configured to detect sharp-turn of one of the boats (1) that navigates in the predetermined water area within a predetermined speed range; a sharp-turn data transmitter unit (222) configured to detect a position data of the one of the boats (1) as a sharp-turn position data when the sharp-turn detector unit (220) detects the sharp-turn of the one of the boats (1) and send the sharp-turn position data to a server (500); a danger level data download unit (226) configured to download from the server (500) danger level data indicating danger level of individual coordinate domains of the predetermined water area (2) divided into mesh-like coordinate domains (P); a danger level data display unit (228) configured to display the downloaded danger level data on a map (M) of the predetermined water area (2) in association with coordinate regions corresponding to the coordinate domains; and an alert/alarm unit (230) configured to inform an operator of each of the boats (1) by displaying an alert or sounding an alarm, when the each of the boats approaches to within a predetermined distance of one of the coordinate regions on the map whose danger level of the danger level data is equal to or greater than a prescribed level.

In the navigation assist apparatus (200), the danger level data display unit (228) is configured to display the downloaded danger level data on the map (M) in colors, and the alert/alarm unit (230) is configured to inform the operator by displaying an alert when the danger level of the danger level data is greater than a first prescribed value of the prescribed level, while informing the operator by sounding an alarm when the danger level of the danger level data is greater than a second prescribed value which is greater than the first prescribed value of the prescribed level.

The navigation assist apparatus further includes: a shock occurrence position data transmitter unit (224) configured to transmit position data of one of the boats (1) to the server (500) as shock occurrence position data, when a G sensor (218) provided on the one of the boats (1) detects a shock exceeding a predetermined value.

Further, the embodiment is configured to have a server (500), comprising: a sharp-turn position data receiver/memory unit (510, 512, 514) configured to receive the sharp-turn position data from navigation assist apparatuses (200) installed on boats (1) navigating in a predetermined water area (2) within a predetermined speed range when one of the boats (1) is turned sharply and stores the received sharp-turn position data in association with the individual coordinate domains of the predetermined water area (2) divided into mesh-like coordinate domains (P); a danger level data update/storage unit (520, 522, 524) configured to determine danger level of individual coordinate regions based on the sharp-turn position data stored in association with the individual coordinate domains, and update and store the danger level data; and a danger level data transmitter unit (530) configured to transmit the danger level data of the individual coordinate regions to the navigation assist apparatuses (200) in response to the download request made by the navigation assist apparatuses (200).

In the server (500), the sharp-turn position data receiver/memory unit (510, 512, 514) is configured to include shock occurrence position data transmitted from the boats (1) as shock occurrence position data when a G sensor (218) provided on the boats (1) detects a shock exceeding a predetermined value, and add the transmitted shock occurrence position data to the received sharp-turn position data stored in association with the individual coordinate domains.

Further, the embodiment is configured to have a navigation assist apparatus (200) installed on boats (1) each fitted with an outboard motor (10) to be able to navigate in a predetermined water area (2), comprising: an electronic control unit (210) having a processor (CPU 210*a*) and at least a memory (ROM 210*b*, RAM 210*c*) coupled to the processor; wherein the processor and memory are configured to perform: detecting sharp-turn of one of the boats (1) that navigates in the predetermined water area within a predetermined speed range; detecting a position data of the one of the boats (1) as a sharp-turn position data when the sharp-turn of the one of the boats (1) is detected and sending the sharp-turn position data to a server (500); downloading from the server (500) danger level data indicating danger level of individual coordinate domains of the predetermined water area (2) divided into mesh-like coordinate domains (P); displaying the downloaded danger level data on a map (M) of the predetermined water area (2) in association with coordinate regions corresponding to the coordinate domains; and informing an operator of each of the boats (1) by displaying an alert or sounding an alarm, when the each of the boats approaches to within a predetermined distance of one of the coordinate regions on the map whose danger level of the danger level data is equal to or greater than a prescribed level.

In the navigation assist apparatus (200), the processor and memory are configured to perform: displaying the downloaded danger level data on the map (M) in colors, and informing the operator by displaying an alert when the danger level of the danger level data is greater than a first prescribed value of the prescribed level, while informing the operator by sounding an alarm when the danger level of the danger level data is greater than a second prescribed value which is greater than the first prescribed value of the prescribed level.

In the navigation assist apparatus (200), the processor and memory are configured to perform: transmitting position data of each of the boats (1) to the server (500) as shock occurrence position data, when a G sensor (218) provided on the each of the boats (1) detects a shock exceeding a predetermined value.

Furthermore, the embodiment is configured to have a method for assisting navigation of boats (1) each fitted with an outboard motor (10) to be able to navigate in a predetermined water area (2), comprising the steps of: detecting sharp-turn of one of the boats (1) that navigates in the predetermined water area within a predetermined speed range (S242-S246); detecting a position data of the one of the boats (1) as a sharp-turn position data when the sharp-turn of the one of the boats (1) is detected and sending the sharp-turn position data to a server (500)(S248-S250); downloading from the server (500) danger level data indicating danger level of individual coordinate domains of the predetermined water area (2) divided into mesh-like coordinate domains (P)(S260-S264); displaying the downloaded danger level data on a map (M) of the predetermined water area (2) in association with coordinate regions corresponding to the coordinate domains (S266); and informing an operator of each of the boats (1) by displaying an alert or sounding an alarm, when the each of the boats approaches to within a predetermined distance of one of the coordinate regions on the map whose danger level of the danger level data is equal to or greater than a prescribed level (S268-S278).

In the navigation assist method, the step of displaying displays the downloaded danger level data on the map (M) in colors (S266), and the step of informing informs the operator by displaying an alert when the danger level of the danger level data is greater than a first prescribed value of the prescribed level, while informing the operator by sounding an alarm when the danger level of the danger level data is greater than a second prescribed value which is greater than the first prescribed value of the prescribed level (S274-S278).

The navigation assist method further includes the step of: transmitting position data of each of the boats (1) to the server (500) as shock occurrence position data, when a G sensor (218) provided on the each of the boats (1) detects a shock exceeding a predetermined value (S252-S256).

It should be noted in the above that various kinds of digital communication terminals with display including portable phones, tablet terminals, smartphones, PDAs and portable personal computer can be used as hardware like the ECU 210, wireless telecommunication module 212 and display 204 constituting the navigation assist apparatus 200.

While the present invention has been described with reference to the preferred embodiments thereof, it will be understood, by those skilled in the art, that various changes and modifications may be made thereto without departing from the scope of the appended claims.

What is claimed is:

1. A navigation assist system having:

a plurality of navigation assist apparatuses installed on boats each fitted with an outboard motor to be able to navigate in a predetermined water area, and a server configured to communicate with the navigation assist apparatuses;

wherein each of the navigation assist apparatuses comprises:

a sharp-turn detector unit configured to detect sharp-turn of one of the boats that navigates in the predetermined water area within a predetermined speed range;

a sharp-turn position data transmitter unit configured to detect position data of the one of the boats as sharp-turn position data when the sharp-turn detector unit detects the sharp-turn of the one of the boats and send the sharp-turn position data to the server;

a danger level data download unit configured to download from the server danger level data indicating a danger level of individual coordinate domains of the predetermined water area divided into mesh-like coordinate domains;

a danger level data display unit configured to display the downloaded danger level data on a map of the predetermined water area in association with coordinate regions corresponding to the individual coordinate domains; and an alert/alarm unit configured to inform an operator of each of the boats by displaying an alert or sounding an alarm, when the each of the boats approaches to within a predetermined distance of one of the coordinate regions on the map whose danger level of the danger level data is equal to or greater than a prescribed level;

wherein the server comprises:

a sharp-turn position data receiver/memory unit configured to receive the sharp-turn position data from the navigation assist apparatuses installed on the boats, and store the received sharp-turn position data in association with the individual coordinate domains of the predetermined water area divided into the mesh-like coordinate domains;

a danger level data update/storage unit configured to determine the danger level of individual coordinate regions based on the sharp-turn position data stored in association with the individual coordinate domains, and update and store the danger level data; and a danger level data transmitter unit configured to transmit the danger level data of the individual coordinate regions to the navigation assist apparatuses in response to a download request made by the navigation assist apparatuses.

2. The navigation assist system according to claim 1, wherein the danger level data display unit is configured to display the downloaded danger level data on the map in colors, and the alert/alarm unit is configured to inform the operator by displaying an alert when the danger level of the danger level data is greater than a first prescribed value of the prescribed level, while informing the operator by sounding an alarm when the danger level of the danger level data is greater than a second prescribed value which is greater than the first prescribed value of the prescribed level.

3. The navigation assist system according to claim 1, wherein the navigation assist apparatuses include:

a shock occurrence position data transmitter unit configured to transmit position data of one of the boats to the server as shock occurrence position data, when a G sensor provided on the one of the boats detects a shock exceeding a predetermined value, and the sharp-turn position data receiver/memory unit is configured to add the received shock occurrence position data to the received sharp-turn position data stored in association with the individual coordinate domains.

4. A navigation assist apparatus installed on boats each fitted with an outboard motor to be able to navigate in a predetermined water area, comprising:

a sharp-turn detector unit configured to detect a sharp-turn of one of the boats that navigates in the predetermined water area within a predetermined speed range;

a sharp-turn position data transmitter unit configured to detect position data of the one of the boats as sharp-turn position data when the sharp-turn detector unit detects the sharp-turn of the one of the boats, and send the sharp-turn position data to a server;

a danger level data download unit configured to download from the server danger level data indicating a danger level of individual coordinate domains of the predetermined water area divided into mesh-like coordinate domains;

a danger level data display unit configured to display the downloaded danger level data on a map of the predetermined water area in association with coordinate regions corresponding to the individual coordinate domains; and an alert/alarm unit configured to inform an operator of each of the boats by displaying an alert or sounding an alarm, when the each of the boats approaches to within a predetermined distance of one of the coordinate regions on the map whose danger level of the danger level data is equal to or greater than a prescribed level.

5. The navigation assist apparatus according to claim 4, wherein the danger level data display unit is configured to display the downloaded danger level data on the map in colors, and the alert/alarm unit is configured to inform the operator by displaying an alert when the danger level of the danger level data is greater than a first prescribed value of the prescribed level, while informing the operator by sounding an alarm when the danger level of the danger level data is greater than a second prescribed value which is greater than the first prescribed value of the prescribed level.

6. The navigation assist apparatus according to claim 4, further including:

a shock occurrence position data transmitter unit configured to transmit position data of one of the boats to the server as shock occurrence position data, when a G sensor provided on the one of the boats detects a shock exceeding a predetermined value.

7. A server, comprising:

a sharp-turn position data receiver/memory unit configured to receive sharp-turn position data from navigation assist apparatuses installed on boats navigating in a predetermined water area within a predetermined speed range when one of the boats is turned sharply and store the received sharp-turn position data in association with individual coordinate domains of the predetermined water area divided into mesh-like coordinate domains;

a danger level data update/storage unit configured to determine danger level of individual coordinate regions based on the sharp-turn position data stored in association with the individual coordinate domains, and update and store danger level data indicating the danger level; and a danger level data transmitter unit configured to transmit the danger level data of the individual coordinate regions to the navigation assist apparatuses in response to the download request made by the navigation assist apparatuses.

8. The server according to claim 7, wherein the sharp-turn position data receiver/memory unit is configured to include shock occurrence position data transmitted from the boats as shock occurrence position data when a G sensor provided on the boats detects a shock exceeding a predetermined value, and add the transmitted shock occurrence position data to the received sharp-turn position data stored in association with the individual coordinate domains.

9. A navigation assist apparatus installed on boats each fitted with an outboard motor to be able to navigate in a predetermined water area, comprising:

an electronic control unit having a processor and at least a memory coupled to the processor;

wherein the processor and memory are configured to perform:

detecting a sharp-turn of one of the boats that navigates in the predetermined water area within a predetermined speed range;

detecting position data of the one of the boats as sharp-turn position data when the sharp-turn of the one of the boats is detected and sending the sharp-turn position data to a server;

downloading from the server danger level data indicating a danger level of individual coordinate domains of the predetermined water area divided into mesh-like coordinate domains;

displaying the downloaded danger level data on a map of the predetermined water area in association with coordinate regions corresponding to the individual coordinate domains; and informing an operator of each of the boats by displaying an alert or sounding an alarm, when the each of the boats approaches to within a predetermined distance of one of the coordinate regions on the map whose danger level of the danger level data is equal to or greater than a prescribed level.

10. The navigation assist apparatus according to claim 9, wherein the processor and memory are configured to perform:

displaying the downloaded danger level data on the map in colors, and informing the operator by displaying an alert when the danger level of the danger level data is greater than a first prescribed value of the prescribed level, while informing the operator by sounding an alarm when the danger level of the danger level data is greater than a second prescribed value which is greater than the first prescribed value of the prescribed level.

11. The navigation assist apparatus according to claim 9, wherein the processor and memory are configured to perform:

transmitting position data of each of the boats to the server as shock occurrence position data, when a G sensor provided on the each of the boats detects a shock exceeding a predetermined value.

12. A method for assisting navigation of boats each fitted with an outboard motor to be able to navigate in a predetermined water area, comprising the steps of:

detecting a sharp-turn of one of the boats that navigates in the predetermined water area within a predetermined speed range;

detecting position data of the one of the boats as sharp-turn position data when the sharp-turn of the one of the boats is detected, and sending the sharp-turn position data to a server;

downloading from the server danger level data indicating a danger level of individual coordinate domains of the predetermined water area divided into mesh-like coordinate domains;

displaying the downloaded danger level data on a map of the predetermined water area in association with coordinate regions corresponding to the individual coordinate domains; and informing an operator of each of the boats by displaying an alert or sounding an alarm, when the each of the boats approaches to within a predetermined distance of one of the coordinate regions on the map whose danger level of the danger level data is equal to or greater than a prescribed level.

13. The navigation assist method according to claim 12, wherein the step of displaying displays the downloaded danger level data on the map in colors, and the step of informing informs the operator by displaying an alert when the danger level of the danger level data is greater than a first prescribed value of the prescribed level, while informing the operator by sounding an alarm when the danger level of the danger level data is greater than a second prescribed value which is greater than the first prescribed value of the prescribed level.

14. The navigation assist method according to claim 12, further including the step of:

transmitting position data of each of the boats to the server as shock occurrence position data, when a G sensor provided on the each of the boats detects a shock exceeding a predetermined value.

* * * * *